United States Patent [19]

Tower et al.

[11] Patent Number: 4,693,862

[45] Date of Patent: Sep. 15, 1987

[54] GAS DISPLACEMENT SPECTRAL SHIFT REACTOR AND CONTROL METHOD

[75] Inventors: Stephen N. Tower, Washington Township, Westmoreland County; Howard E. Braun, Pittsburgh; David E. Boyle, Kiski Township, Armstrong County; Robert B. Salton, Plum Boro, all of Pa.

[73] Assignee: Westinghouse Electric Corp., Pittsburgh, Pa.

[21] Appl. No.: 626,846

[22] Filed: Jul. 2, 1984

[51] Int. Cl.⁴ .......................... G21C 1/00; G21C 3/32
[52] U.S. Cl. .................................... 376/209; 376/203; 376/221; 376/328; 376/346; 376/368; 376/456
[58] Field of Search ............... 376/209, 221, 327, 328, 376/346, 456, 352, 203, 368, 230

[56] References Cited

U.S. PATENT DOCUMENTS

| | | |
|---|---|---|
| 2,979,450 | 4/1961 | Dosbabek . |
| 3,025,228 | 3/1962 | Whitelaw . |
| 3,036,964 | 5/1962 | Horning ............................ 376/327 |
| 3,212,984 | 10/1965 | Tollet et al. ...................... 376/209 |
| 3,247,068 | 4/1966 | Schluderberg et al. . |
| 3,247,072 | 4/1966 | Edlund et al. . |
| 3,247,074 | 4/1966 | Schluderberg et al. . |
| 3,247,075 | 4/1966 | Ryon et al. . |
| 3,255,087 | 6/1966 | Maldague . |
| 3,261,755 | 7/1966 | Mostert . |
| 3,275,521 | 9/1966 | Schluderberg et al. . |
| 3,342,689 | 9/1967 | Gaudez et al. ..................... 376/368 |
| 3,560,337 | 2/1971 | Tonarelli ........................... 376/368 |
| 3,629,059 | 12/1971 | Agazzi et al. . |
| 4,088,534 | 5/1978 | Andrieu et al. ..................... 376/327 |
| 4,371,495 | 2/1983 | Marlatt ............................. 376/209 |

FOREIGN PATENT DOCUMENTS

| | | | |
|---|---|---|---|
| 916324 | 1/1963 | United Kingdom ............... 376/221 |
| 954101 | 4/1964 | United Kingdom ............... 376/221 |
| 1029712 | 5/1966 | United Kingdom ............... 376/221 |
| 1108349 | 4/1968 | United Kingdom ............... 376/346 |
| 1117315 | 6/1968 | United Kingdom ............... 376/209 |

OTHER PUBLICATIONS

SROO-207-30, Jun. 1964, Weems et al., pp. VI-1, VI-2, VI-3, Figures (IV-3, IV-5, (VI-1)-(VI-12), (VI--18)-(VI-20), VII-17, VII-28, VII-50, VII-51, pp. VI-4, VI-5.

Primary Examiner—Harvey E. Behrend
Attorney, Agent, or Firm—Daniel C. Abeles

[57] ABSTRACT

A method and apparatus for extending the life of a core of a water moderated nuclear reactor by spectral shift comprising the displacement of a portion of the moderator in the core by a gas having a low neutron cross-section during the initial stage of the life of the core and displacing the gas and replacing it with moderator during the latter part of the life of the core.

7 Claims, 6 Drawing Figures

GAS DISPLACEMENT SPECTRAL SHIFT REACTOR AND CONTROL METHOD

BACKGROUND OF THE INVENTION

1. Field of the Invention

This invention relates in general to the field of spectral shift pressurized water nuclear reactors and in particular to a gas displacement spectral shift pressurized water nuclear reactor.

2. Description of the Prior Art

In typical pressurized water nuclear reactors, control over the fission process, or reactivity control is accomplished during reactor operation by varying the amount of neutron moderating and absorbing materials within the core of the reactor. One method to effectuate reactivity control is by the use of control rods containing such neutron absorbing materials or poisons which are inserted within the reactor core. Control over the fission process may be accomplished by varying the number of control rods, the size of the control rods and their radial and axial locations within the core. Burnable poisons (by the fissioning process) and poisons dissolved in the reactor coolant can additionally be used for purposes of such control.

In order to lengthen the core life, (time between refuelings), it is typical, in conventionally designed commercial pressurized water reactors, to design in an excess of reactivity at reactor start-up. The excess reactivity is controlled as stated above, and is gradually depleted over the extended life of the core. Soluble boron, dissolved in the reactor coolant is most often used in light water PWR's to control the initial excess reactivity. As the excess reactivity in the core is depleted during the reactor operation, the neutron absorbing boron is gradually removed so as to utilize the original excess reactivity to maintain the fission process. While this control arrangement provides an effective means of controlling a nuclear reactor over an extended core life, the neutron absorbing boron used during core life absorbs neutrons and removes reactivity from the reactor core that could otherwise be used in a more productive manner. For example, the reactivity could be used to convert fertile material to plutonium or to fissile uranium which even further extends the reactor core life by fissioning the then generated fissile material. Without such conversion, however, the consumption of reactivity is an inefficient depletion of uranium resulting in higher fuel costs than would otherwise result. In view of the above, it would be an obvious advantage to be able to extend the life of a core having an initial amount of excess reactivity while not suppressing the excess reactivity with neutron absorbing materials, but rather using the excess reactivity in a positive manner thereby providing an extended core life with a significantly lower overall fuel cost.

It is well known that fuel element enrichment can be reduced and the conversion ratio of producing fissile materials can be increased by employing a "hardened" (higher neutron energy) spectrum during the first part of the fuel cycle to reduce excessive reactivity and to increase the conversion of fertile material to fissile material; then employing a "softer" (lower energy) neutron spectrum during the latter part of the fuel cycle to increase reactivity and extend the core life by fissioning the previously generated fissile material. One such method utilizing the above is known as spectral shift control which provides a reactor with an extended core life while reducing the amount of neutron absorbing material in the reactor core. One example of such method of control comprises a mechanical spectral shift reactor whereby hollow displacer rods are provided within fuel assemblies within the core (which, of course, displace an equal volume of water within the fuel assemblies) and which are mechanically withdrawn or punctured to accomplish water flooding of the available volume. In the early stages of core life, the neutron spectrum is hardened by the displacement of a portion of the water within the core by the displacer rods. The spectrum is later softened by the addition of water within the core by the aforesaid rod withdrawal or puncturing. Patent Application Ser. No. 217,054, now U.S. Pat. No. 4,432,930, entitled "Spectral Shift Reactor Control Method" by A. J. Impink, Jr. et al., filed on Dec. 16, 1980, assigned to Westinghouse Electric Corporation, discloses one such mechanical shift reactor.

Another method of achieving a spectral shift is to utilize heavy water or deuterium oxide to replace an equivalent volume of core water during the early stages of core life than to gradually reduce the volume of heavy water and replace it with regular reactor water during the later stages of core life. The less effective moderator, heavy water, allows for less fuel enrichment and a higher ratio of converting fertile material to fissile which in combination provides for a reduction of fuel costs and an extension of core life. An example of this art is found in Patent Application Ser. No. 626,847 entitled "Fuel Assembly" by R. K. Gjertsen et al., filed on July 2, 1984, and assigned to Westinghouse Electric Corporation.

While the concept of spectral shift control of a pressurized water nuclear reactor exists in various forms, there exists a continuing need to more effectively implement the concept by providing apparatus and methods having decreased complexity, lower overall costs, compatability with existing commercially available nuclear reactors, and which, of course, further enhance the safety of nuclear reactors.

It is, therefore, a primary object of the present invention to provide apparatus and a method for a pressurized water nuclear reactor which includes means for varying the reactor coolant water volume over the life of a core by replacing a portion of the water with a gas having negligible neutron absorption and moderating properties during the early stages of core life and then gradually replacing the gas with ordinary reactor coolant as the core life decreases.

SUMMARY OF THE INVENTION

The present invention comprises a gas displacement spectral shift pressurized water reactor including a method for controlling a pressurized water reactor by a gas displacement spectral shift. A gas having low neutron absorption and moderating properties such as helium is introduced through the pressure vessel to holes machined into the lower core support plate from whence the gas is distributed to each fuel assembly within the core. Each fuel assembly includes a gas riser tube within which the gas rises to a manifold located at the top nozzle. The upper manifold is parallel connected to a plurality of thimbles such that the gas fills the plurality of thimbles to effectively displace water downwardly within the fuel assembly. A lower manifold collects and allows the gas to exit the fuel assembly through passages in the lower core support plate from where it exits the reactor pressure vessel through pipes. The gas flow path permits reintroduction of water in the core in a reverse flow pattern.

A gas/water system is provided external to the pressure vessel for supply and make-up of high pressure gas and water. A passive pressure balance control system reduces the differential pressure between the gas and water within the reactor to near zero to assure the integrity of the gas connector joints within the pressure vessel.

BRIEF DESCRIPTION OF THE DRAWINGS

For a more complete understanding of the invention, reference is had to the following description taken in conjunction with the accompanying drawings in which.

DESCRIPTION OF THE PREFERRED EMBODIMENTS

Figure 1:
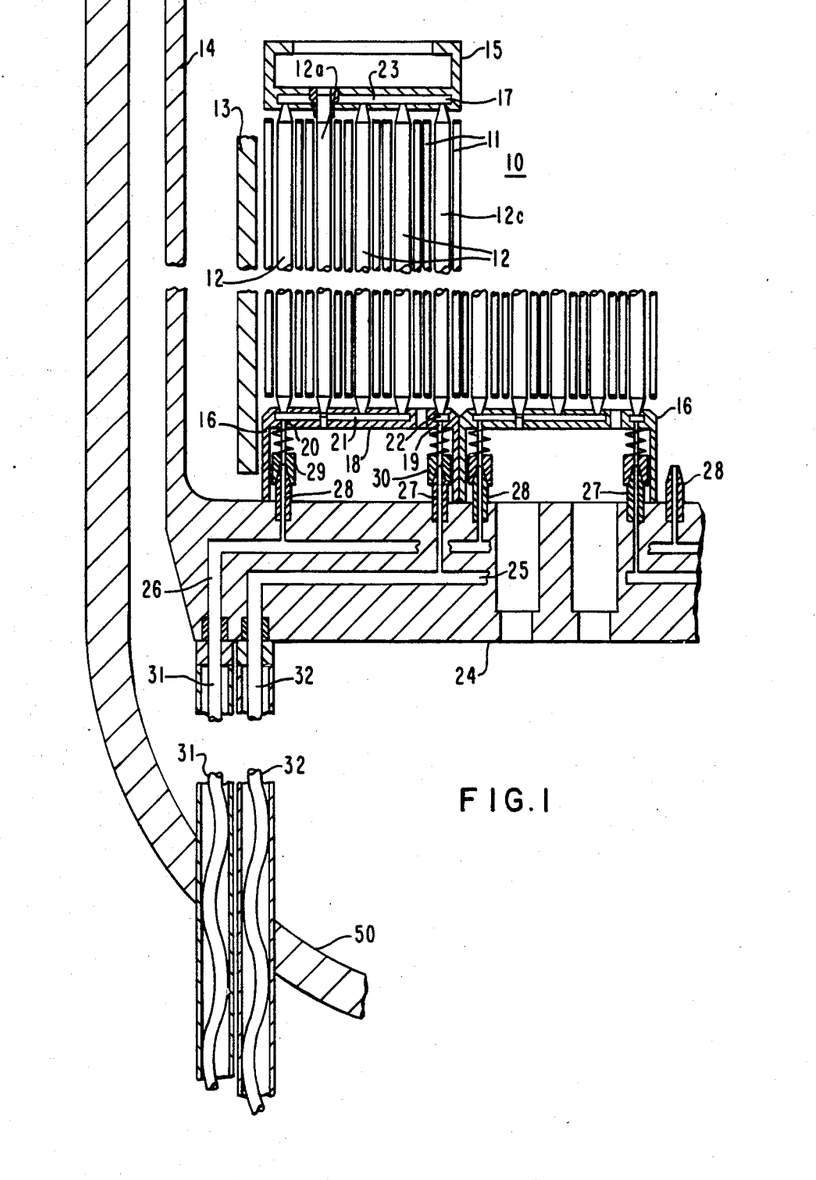
FIG. 1 is a schematic, partially cross-sectional view of a portion of a reactor vessel incorporating one embodiment of the present invention.

Referring now to FIG. 1 of the drawings, there is illustrated therein, in schematic form, one embodiment of the present invention comprising a gas displacement spectral shift reactor. A fuel assembly generally designated by the numeral 10 includes a plurality of fuel rods 11 which may be arranged in a 20-by-20 square configuration with an equal pitch or spacing between adjacent fuel rods 11. Fuel rods 11 may comprise elongated cylindrical metallic tubes containing nuclear fuel pellets and having each end sealed by appropriately shaped end plugs. Such fuel rods 11 are well known in the art. Grids (not shown) are positioned at various locations along the length of fuel assembly 10 and serve to space fuel rods 11 at appropriate distances from each other (pitch) and to allow reactor coolant to circulate in heat transfer relationship with fuel rods 11. A more detailed description of one such grid may be found in U.S. Pat. Nos. 3,379,617 and 3,379,619, both issued in the name of H. N. Andrews et al., and assigned to Westinghouse Electric Corporation.

Figure 2:
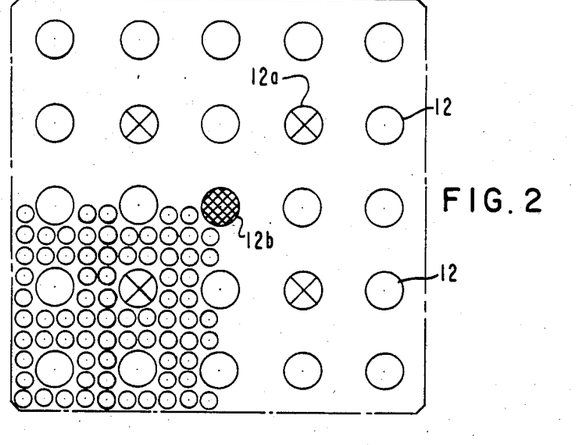
FIG. 2 is a cross-sectional view of the fuel assembly of FIG. 1.

FIG. 2 depicts the square array of fuel rods 11. Also shown in FIG. 2 are twenty-five thimbles 12 preferably made from Zircaloy. Each thimble 12 occupies the space of and displaces four fuel rods 11. Hence, there are a total of three hundred fuel rods 11. The thimbles 12 are arranged in a five-by-five square array with an equal pitch between adjacent thimbles 12. The four thimbles 12 marked with a cross within the circumference thereof comprise guide thimbles 12a which are adapted to receive a control rod cluster (not shown in FIGS. 1 or 2) which serve to control the fission process in maintaining the criticality of the nuclear core. The central thimble 12b may be used for purposes of instrumentation.

Figure 3:
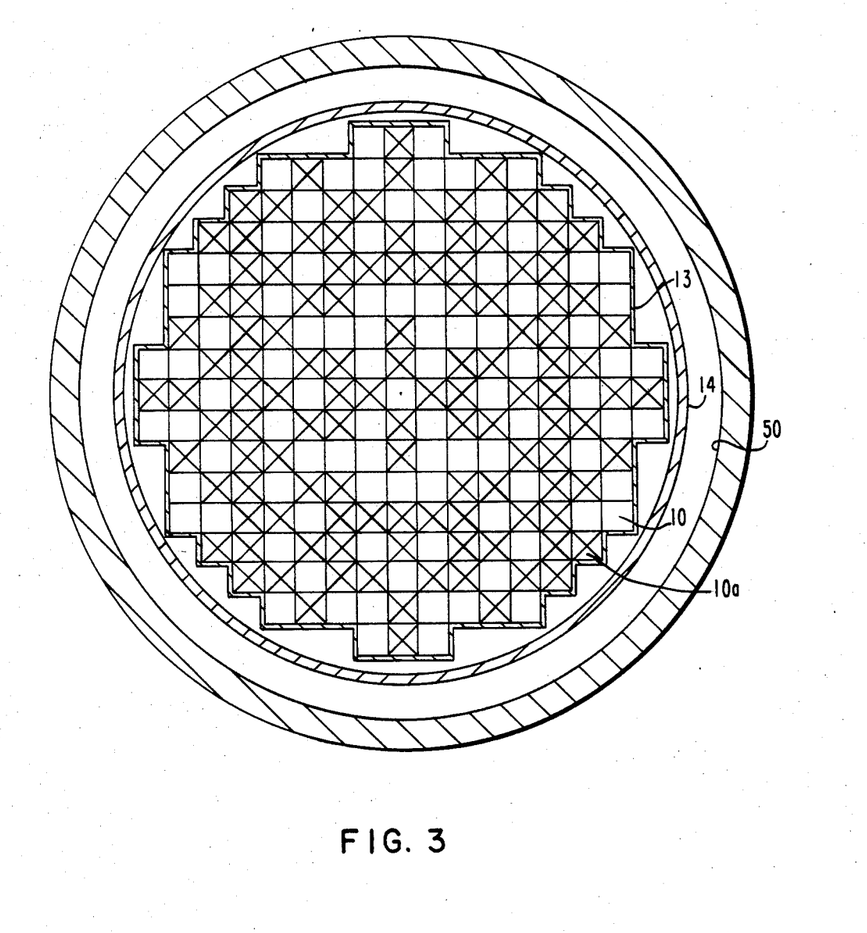
FIG. 3 is a schematic cross-sectional view of the core of FIG. 1.

FIG. 3 is a schematic cross-sectional view of the core of FIG. 1. As can be seen, there are a total of two hundred and thirteen fuel assemblies 10 of which one hundred and thirty-two are adapted to receive rod control clusters. Fuel assemblies 10a shown with a cross positioned diagonally across the corners thereof represents that a rod control cluster (not shown) is used at each of these locations. In actuality, fuel assemblies 10 are the same as fuel assemblies 10a. Hence, even though each fuel assembly 10 does not receive a rod control cluster, it does contain guide thimbles 12a. In this manner, all fuel assemblies within the core are interchangeable. It is to be noted that the arrangement shown in FIG. 3 positions each of two fuel assemblies 10a side-by-side to each other. This arrangement allows two rod control clusters to be attached to a single control rod drive mechanism thereby reducing the number of drive mechanisms while providing adequate control rod worth. A baffle plate 13 surrounds fuel assemblies 10 and 10a. A core barrel 14 in turn surrounds the baffle plate 13, and, as is typical in pressurized water reactor art, a pressure vessel 50 encompasses the nuclear core and all of the associated components.

Referring again to FIG. 1, the fuel assembly includes a top nozzle 15 and a bottom nozzle 16. In addition to the normal function of providing plenums for directing inlet and outlet reactor coolant flow, the top 15 and bottom 16 nozzles also provide for structural support of the fuel rods 11 and the thimbles 12, for fuel assembly 10 lateral location, for fuel rod capture, for fuel handling tools, etc., all of which are generally well known in the art. In the invention disclosed herein, the top 15 and bottom 16 nozzles also include upper 17 and lower 18 manifolds and entrance 19 and exit 20 connections for reactor coolant displacement gas. Upper 17 and lower 18 manifolds are flow connected to the twenty thimbles 12 but not to the four guide thimbles 12a, nor to the one instrumentation thimble 12b. Passage 21 in lower manifold 18 is sealingly connected to nineteen thimbles 12 at their lower ends and to exit 20. Passage 22 is sealingly connected to one thimble 12 at its lower end and to entrance 19. Passage 23 in top nozzle 17 is sealingly connected to the upper ends of all twenty thimbles 12. Passages 21 and 23 may be appropriately gun drilled in their respective nozzles 16 and 17, with the ends thereof being seal welded to insure a hermetically sealed joint. Thimbles 12 may be threaded and seal welded to bottom nozzle 16 and flange connected and seal welded to top nozzle 15 thereby providing structural support while insuring hermetic seals. Guide thimbles 12a and instrumentation thimble 12b may pass through top nozzle 15 such as by a connection sleeve attached to top nozzle 15 to which the guide 12a and instrumentation 12b thimbles may be bulge attached. The lower end of guide thimbles 12a and instrumentation thimble 12b may be attached to bottom nozzle 16 much in the same manner as thimbles 12. As previously stated, however, thimbles 12a and 12b are not flow connected to flow passages 21, 22, or 23.

A typical lower core support plate with modifications may be used in conjunction with the invention herein. A partial schematic view of such a core support plate is shown in FIG. 1. As shown, but not necessary to the invention, core support plate 24 comprises a stainless steel forging or casting approximately 18 inches thick which is attached to core barrel 14. Gas inlet flow passages 25 and gas outlet flow passages may be gun drilled in core support plate 24. Inlet passage 25 is connected to a riser tube 27 existing at each location of a fuel assembly 10 within the core. Riser tubes 27 may be threaded and seal welded to core support plate 24. Similarly, outlet flow passage 26 is sealingly connected to a riser tube 28 at each fuel assembly 10 location. Gas connectors 29 and 30 are, respectively, interposed between riser tube 28 and exit 20 and riser tube 27 and entrance 19 for purposes of providing a sealed connection therebetween. Seal connectors 29 and 30 may be identical to each other and include a line contact seal (such as a ball and cone joint) loaded by a suitable spring force and a piston ring breakdown seal to limit in and out flow leakage in the event of unseating of the line contact seal.

Lines 31 and 32 comprise water in/gas out and gas in/water out passages, respectively. Lines 31 and 32 are sealingly connected to lower core support plate 24. FIG. 1 shows one method by which the gas inlet and gas outlet lines penetrate the pressure vessel and are sealingly connected thereto. The method shown in FIG. 1 also allows for differential thermal expansion between the reactor vessel 50 and the lower core support plate 24.

In operation, the gas displacement system shown in FIGS. 1 through 3 operates as follows. During the initial stages of core life, when it is desirable to reduce excess reactivity and to increase the conversion of fertile material to fissile material, gas displacement of a portion of reactor coolant is effectuated. Gas such as helium is caused to enter the pressure vessel 50 through gas in/water out line 32. The gas then flows through passage 25 in the lower core support plate 24 where it simultaneously flows up through each of the gas inlet risers 27, through connectors 30 and into inlet passage 22 in lower manifold 18. From lower manifold 18, the gas rises up the single gas riser tube or thimble 12c in each fuel assembly 10. While rising, the gas, of course, displaces the reactor coolant water within gas riser tube 12c. The gas then completely fills the flow passage 23 in upper manifold 17 and flows down each of the nineteen thimbles 12. In so flowing, the gas displaces by gravity the reactor coolant water contained in thimbles 12. Ultimately, the gas reaches passage 21 in lower manifold 18, exits through exit port 20, flows through connector 29 into channel 26 in the lower core support plate 24. Then the gas exits the pressure vessel 50 through gas out/water in line 31. Once the gas has filled all of the thimbles 12c and 12, the gas flow stops, except to make up any leakage that may occur. In this manner, a substantial portion of the reactor coolant has been displaced within each fuel assembly 10 by a gas having negligible neutron absorbing characteristics. For the system shown in FIGS. 1 through 3, it is calculated that an approximately 21% water-to-uranium ratio change results. This ratio can be further increased by using a fuel rod location as an instrumentation thimble in place of thimble 12b which then can be used for gas displacement service along with the nineteen thimbles 12.

The above-described gas displacement system offers a number of advantages not achieved with either heavy water spectral shift or mechanical spectral shift reactors. The system provides a gas trap since it is sealed by the upper manifold 18. Therefore, the thimbles 12 can only be flooded slowly (by gas absorption) in the event of an external gas system failure. This prevents rapid accidental reactivity insertions. Also, reactor coolant water can be displaced from thimbles 12 in a very controlled predictable way with relatively small gas flow because the light gas rises to the upper manifold 17 where it collects and forms a distinct gas-liquid interface pushing the coolant water out through each thimble 12. This is aided by the relatively small cross-sectional area of the single riser thimble 12c which easily permits it to be blown free of the water initially contained therein. Conversely, the same small cross-sectional area of the tube 12c permits it to be subsequently easily backfilled with water during the latter stages of core life.

With regard to the backfilling of riser tube 12c and thimbles 12, when it is desired to increase the reactivity, coolant water can be reintroduced into the core in the same predictable manner as the gas was introduced but using a reverse flow procedure. Still another advantage is that the location of both connector joints 29 and 30 at the same core level substantially eliminates any external pressure differential between the two joints. Hence, even if the joints leak, however slightly, there is no net external force to push coolant water through the trapped gas volume and cause a rapid reactivity insertion.

Figure 4:
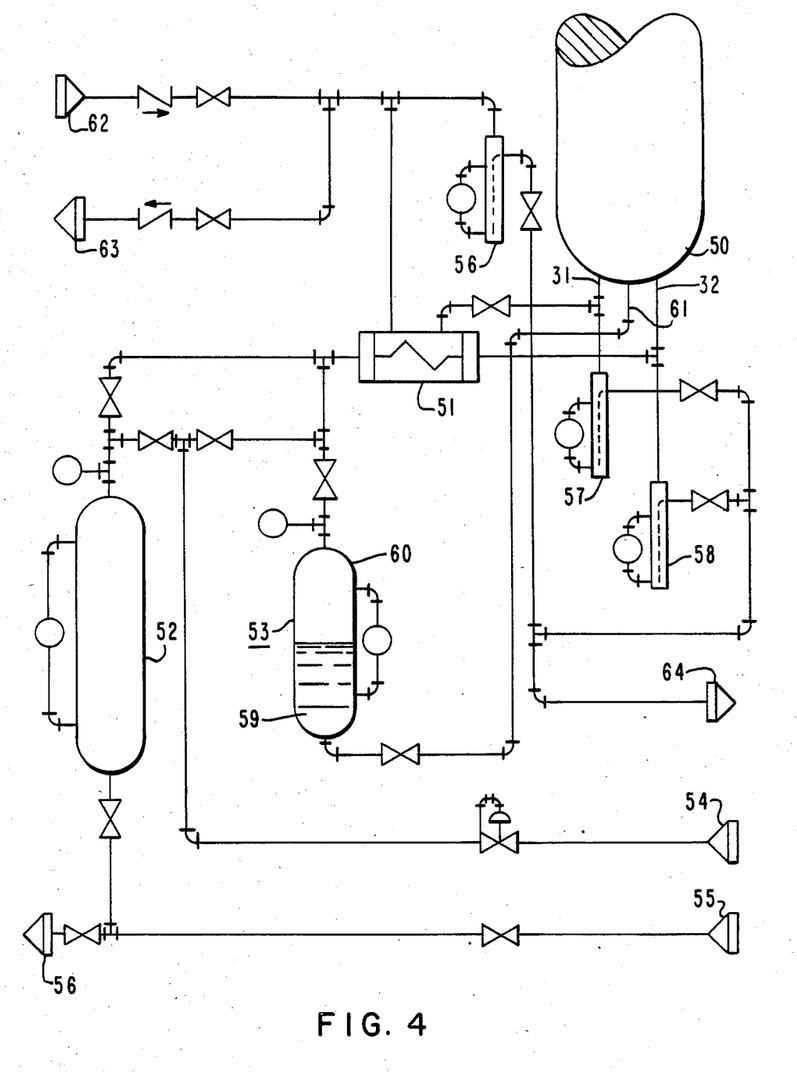
FIG. 4 is a schematic view of a gas and water system for use with the spectral shift reactor of FIG. 1.

The gas displacement spectral shift reactor requires a gas and reactor coolant water system to perform the spectral shift function. One such system is shown in FIG. 4. It includes provisions for supply and make-up of high pressure gas, for supply of high pressure water, for recovery storage and reuse of gas, for recovery and reuse of water and for indicating leakage of either the gas or the water within the reactor vessel 50.

Gas supplied to the core enters the reactor vessel 50 through gas in/water out line 32. Line 32 is connected to a heat exchanger 51 for purposes of heating the gas prior to its entrance into the reactor vessel 50. Heat exchanger 51 is commonly connected to a gas storage tank 52, the gas side 60 of a pressure equalizer 53 and a gas make-up supply 54. Gas storage tank 52 is further connected to the cold water charging system 55 and the cold chemical and volume control system letdown 56 as shown in FIG. 4.

Water supplied to the core enters the reactor vessel 50 through the water in/gas out line 31 which is connected to the hot water charging system 62. The water supply arrangement also includes a drain connected to the hot chemical volume control system letdown 63. Leak detectors 56, 57 and 58 are included and appropriately located within the system to indicate any water or gas leakage within the fuel assemblies 10 within the core or any leakage of the hot charging system 62. The outlet of the leak detectors are connected to a pressurizer relief tank 64.

As shown and described, the gas/water system utilizes a "passive" pressure balance control between the gas and the reactor coolant water to enhance the integrity of the gas/water system within the reactor vessel 50 by reducing any pressure differential, particularly at the gas connection joints 29 and 30 to near zero. The pressure equalizer 53 may comprise a tank or stand pipe which interconnects the water system and the gas system and maintains a gas-water interface, that is a gas volume above a liquid volume. The water side 59 of equalizer 53 is connected to the reactor coolant supply at the fuel assembly inlet 61. Any reactor coolant supply pressure fluctuations will cause surges reflected by a change in the equalizer 53 liquid level thereby compressing or expanding the gas volume 60 and maintaining the pressure balance between the gas and water systems.

The operation of the gas displacement spectral shift reactor would be as follows: Normal reactor start-up procedures are utilized in bringing the reactor to hot shutdown conditions. At this time, all the thimbles, manifolds, flow channels within the core, etc., are flooded with boronated water. High pressure gas, such as helium, is gradually introduced within the thimbles 12 while the boronated water is being expelled through the hot chemical and volume control system letdown 63. This is accomplished by compressing and displacing the gas in the storage tank 52 with high pressure water from the cold charging system 55. The control rods are withdrawn, the boron concentration is reduced and the reactor is brought to power. The passive gas/water system remains passive except for any small gas leakage which may occur and which leakage is made up through gas make-up 54. Any such leakage which may occur within the core is removed by a gas removal system (using the hot chemical volume control system letdown 63) which is well known in the art. Reactor power operation is continued for approximately two-thirds of the normal fuel cycle time. The reactor is then brought down to hot shutdown conditions and the gas within the thimbles 12 is displaced by boronated water from the hot chemical volume control system 62. The displaced gas is recovered and stored within tank 52 for reuse with the next fuel cycle. The reactor is then brought back to power which is continued for the remainder of the approximate one-third fuel cycle. At the end of the fuel cycle, new fuel may be added and the above-stated procedure is repeated.

Figure 5:
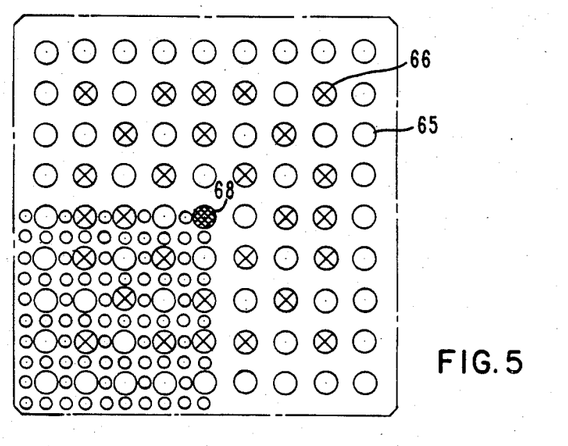
FIG. 5 is a cross-sectional view of another fuel assembly which may be used with the embodiment of FIG. 1.

An alternate to the fuel assembly 10 previously described for the gas displacement spectral shift reactor is shown in FIG. 5. This embodiment uses small gas displacement thimbles 65 as well as small guide thimbles 66 which are a one-for-one substitution for a fuel rod 67. In this embodiment, the fuel assembly comprises a 19-by-19 array. There are fifty-two gas displacement thimbles 65, twenty-eight guide thimbles 66 and one instrumentation thimble 68. Small thimbles have the advantage of providing a more uniform dispersion of void within the fuel moderator lattice and reduce nuclear peaking because of the smaller water hole.

Figure 6:
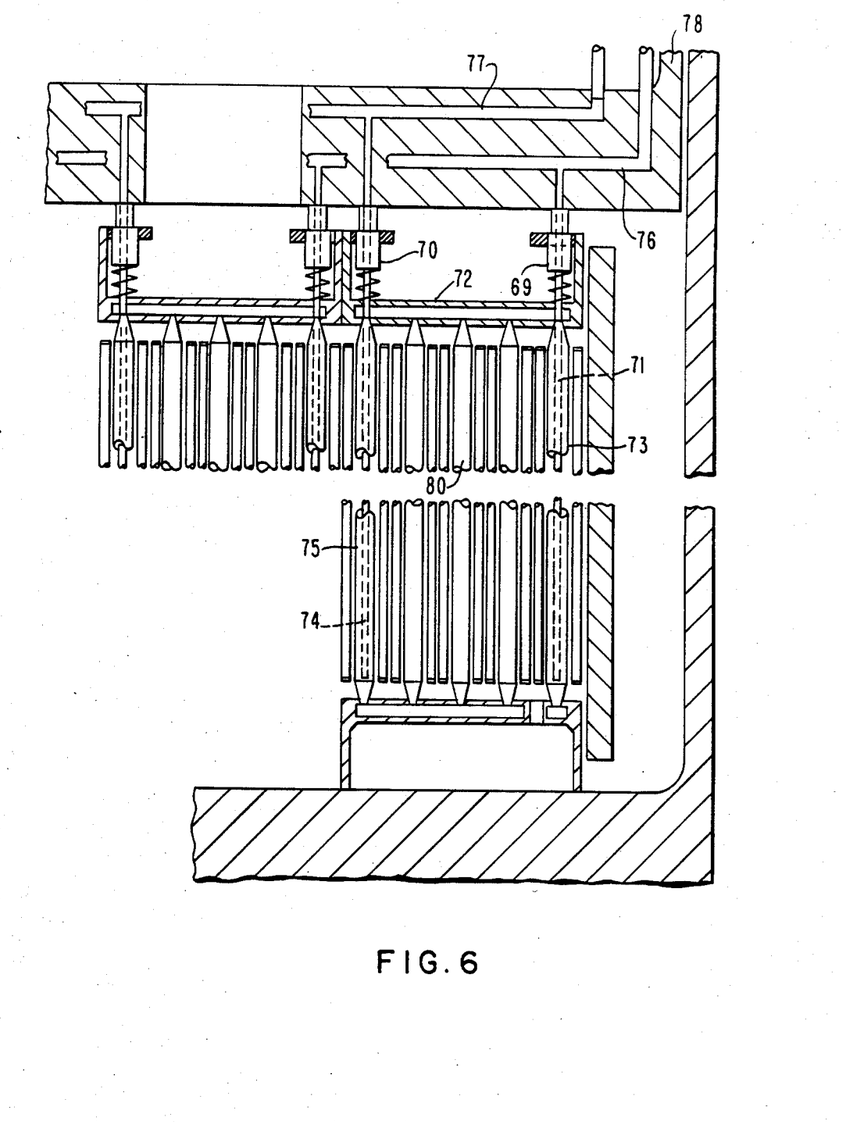
FIG. 6 is a schematic, partially cross-sectional view of a portion of a reactor vessel incorporating another embodiment of the present invention.

In lieu of having the gas enter the bottom of the fuel assembly, the invention disclosed herein contemplates plates gas being introduced at the top of the fuel assembly. This embodiment is schematically shown in FIG. 6 which essentially is an inverse of the embodiment of FIG. 1. Gas inlet 69 and outlet 70 connectors are located at the top of the fuel assembly. Inlet connector 69 is connected to a dip tube 71 which passes through upper manifold 72 and into gas displacement thimble 73. Similarly, a dip tube 74 is provided within gas exit/water inlet thimble 75 which is connected to outlet connector 70. This arrangement guarantees a trapped gas volume within the fuel assembly as provided in the embodiment of FIG. 1. Gas is supplied to and exits from the fuel by flow channels 76 and 77 provided in the upper core support plate 78. Gas entering the fuel assembly flows through dip tube 71 and up thimble 73 to the upper manifold 72. From upper manifold 72, the gas flows down the remaining thimbles 80 and in so doing voids thimbles 73 and 80 of water. The gas then exits through dip tube 74 through exit connector 70, into exit flow channel 77 and finally out of the pressure vessel.

The invention above-described utilizes helium as the displacement gas. Helium is preferred because of its very low neutron cross-section and because it has such a low density that its moderating effect is negligible. Other gases may be used as an alternative. These include hydrogen, steam, nitrogen and argon, to name some. Still others may be used which although not specifically mentioned are intended to be included within the scope of this invention.

We claim:

1. In a liquid moderated, pressurized water nuclear reactor having initial excess reactivity, said reactor having a core formed from a plurality of fuel assemblies, each fuel assembly having fuel rods structurally supported between top and bottom nozzles, with said core being positioned within a pressure vessel between upper and lower core support plates, a method of extending core life by spectral shift comprising the steps of:

displacing a portion of the liquid moderator in the core by a gas having a low neutron absorption cross-section, from a gas supply outside said pressure vessel, during the initial stage of the life of the core by introducing said gas, from inlet flow channels in one of said core support plates, into a plurality of hollow, moderator displacement elements comprising hollow rods, sealed from reactor primary coolant flow, disposed among and arranged coextensively with fuel rods within the core, where the gas is introduced from said inlet flow channels through a first seal connector into a lower end of a first of said hollow, moderator displacement elements, and displacing said liquid moderator through the upper end of said first element;

forming a gas liquid interface at the upper end of said plurality of hollow, moderator displacement elements;

displacing the liquid moderator from within the remainder of said hollow, moderator displacement elements by said gas, from the upper end of said first element, by displacing the liquid moderator from the upper end through the lower end of said remainder of said hollow, moderator displacement elements, with said gas exiting from said remainder of said hollow, moderator displacement elements through a second seal connector, and through outlet flow channels in said one of said core support plates, with both of said seal connectors being located at the same horizontal core level, the upper ends of said hollow, moderator displacement elements being flow connected, thereby trapping said gas within said moderator displacement elements; and replacing said gas with liquid moderator, from a liquid moderator supply outside said pressure vessel, during the latter part of the life of the core.

2. In a liquid moderator, pressurized water nuclear reactor having a core formed of a plurality of fuel assemblies, each fuel assembly having fuel rods structurally supported between top and bottom nozzles, said core being positioned within a pressure vessel, between upper and lower core support plates, a spectral shift apparatus comprising;

an upper manifold in said top nozzle;

a lower manifold in said bottom nozzle;

inlet flow channels and outlet flow channels in one of said core support plates;

a plurality of elongated hollow rods, sealed from reactor primary coolant flow, disposed among and coextensive with the fuel rods within said core between said top and bottom nozzles, said hollow rods being flow connected therebetween at the upper ends thereof through said upper manifold, for displacing a portion of the moderator by a gas within the core during the initial stage of the life of said core;

a first seal connector, flow connecting an inlet flow channel of said core support plate to one of said hollow rods, and a second seal connector, flow connecting an outlet flow channel of said core support plate to the remainder of said hollow rods, said first seal connector also connected to a gas supply, outside said pressure vessel, said gas having a low neutron absorption cross-section, and said second seal connector also being connected to a liquid moderator supply, outside said pressure vessel;

said first and second seal connectors positioned at substantially the same horizontal core locations, whereby gas injected into said first seal connector flows through said one of said hollow rods displacing liquid therefrom and then forms a gas-liquid interface in said upper manifold and displaces liquid from the remaining hollow rods to said lower manifold and from said second seal connector; and means for replacing said gas with liquid moderator during the latter part of the life of the core;

said first and second seal connectors, said hollow rods, and said upper and lower manifolds all being part of a closed fluid circuit sealed from reactor primary coolant inside said pressure vessel.

3. The method of claim 1 including the step of replacing said displaced moderator by reintroducing said moderator into the lower end of said remainder of said plurality of hollow, moderator displacement elements, flowing said moderator up said remainder of said plurality of hollow, moderator displacement elements and into the upper end of said first hollow, moderator displacement element, and exiting said moderator from the lower end of said first hollow, moderator displacement element.

4. The apparatus of claim 1 wherein said seal connectors are located at the lower end of said hollow rods.

5. The apparatus of claim 1 wherein said seal connectors are located at the upper end of said hollow rods.

6. The apparatus of claim 1 including means for pressure balancing the gas within said hollow rods and the liquid moderator within the core thereby substantially eliminating any pressure differential therebetween.

7. The apparatus of claim 6 wherein said pressure balancing means comprises a container connected to said gas and to said moderator, whereby said container maintains therein a gas-to-water interface which raises or lowers in accordance with pressure fluctuations of said moderator.

* * * * *